(12) United States Patent
Homeyer et al.

(10) Patent No.: US 6,842,686 B2
(45) Date of Patent: Jan. 11, 2005

(54) METHOD AND DEVICE FOR CONTROLLING THE DRIVE UNIT OF A VEHICLE

(75) Inventors: Manfred Homeyer, Markogroeningen (DE); Lilian Kaiser Matishok, Stuttgart (DE); Michael Nicolaou, Ober-Ramstadt (DE); Holger Jessen, Dortmund (DE); Thomas Schuster, Allmersbach (DE); Werner Kind, Markgroeningen (DE); Rainer Mayer, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 37 days.

(21) Appl. No.: 10/240,717

(22) PCT Filed: Mar. 24, 2001

(86) PCT No.: PCT/DE01/01153

§ 371 (c)(1),
(2), (4) Date: Oct. 4, 2002

(87) PCT Pub. No.: WO01/75288

PCT Pub. Date: Oct. 11, 2001

(65) Prior Publication Data

US 2003/0100405 A1 May 29, 2003

(30) Foreign Application Priority Data

Apr. 4, 2000 (DE) .................................. 100 166 458
Jun. 19, 2000 (DE) .................................. 100 291 686
Sep. 26, 2000 (DE) .................................. 100 480 152

(51) Int. Cl.[7] ............................................. G05D 1/00
(52) U.S. Cl. ........................... 701/84; 701/87; 180/197
(58) Field of Search .............................. 701/84, 85, 86, 701/87, 93, 95, 94, 70, 101, 102, 110; 180/197

(56) References Cited

U.S. PATENT DOCUMENTS 6,144,913 A * 11/2000 Braun et al. ................. 701/110

FOREIGN PATENT DOCUMENTS

| DE | 195 36 038 | 4/1997 |
|---|---|---|
| DE | 197 39 564 | 3/1999 |
| DE | 197 39 567 | 3/1999 |
| DE | 199 53 767 | 5/2001 |
| EP | 0 933 522 | 8/1999 |

OTHER PUBLICATIONS

"Die neue Motorsteuerung ME 7.2 von Bosch fuer den BMW V8–Motor" by D. Meisberger et al, MTZ Motortechnische Zeitschrift, vol. 59, No. 12, Dec./1998, pp. 826 to 834.

"Die neue Motorsteuerung von Siemens fuer die BMW Sechszylinder–Ottomotoren" by R. Beckmann et al, MTZ Motortechnische Zeitschrift, vol. 59, No. 12, Dec. 1998, pp. 820 to 825.

* cited by examiner

Primary Examiner—Richard M. Camby
(74) Attorney, Agent, or Firm—Walter Ottesen

(57) ABSTRACT

A method and an arrangement for controlling the drive unit of a vehicle are suggested. In a first step, input quantities, which are independent of the drive unit, are applied to form a first input quantity. In a second step, a second input quantity is formed from at least this first input quantity and at least one engine-specific input quantity, the second input quantity influencing at least an actuating quantity of the drive unit. In addition, an interface is described between the engine-independent part and the engine-specific part of the engine control.

15 Claims, 8 Drawing Sheets

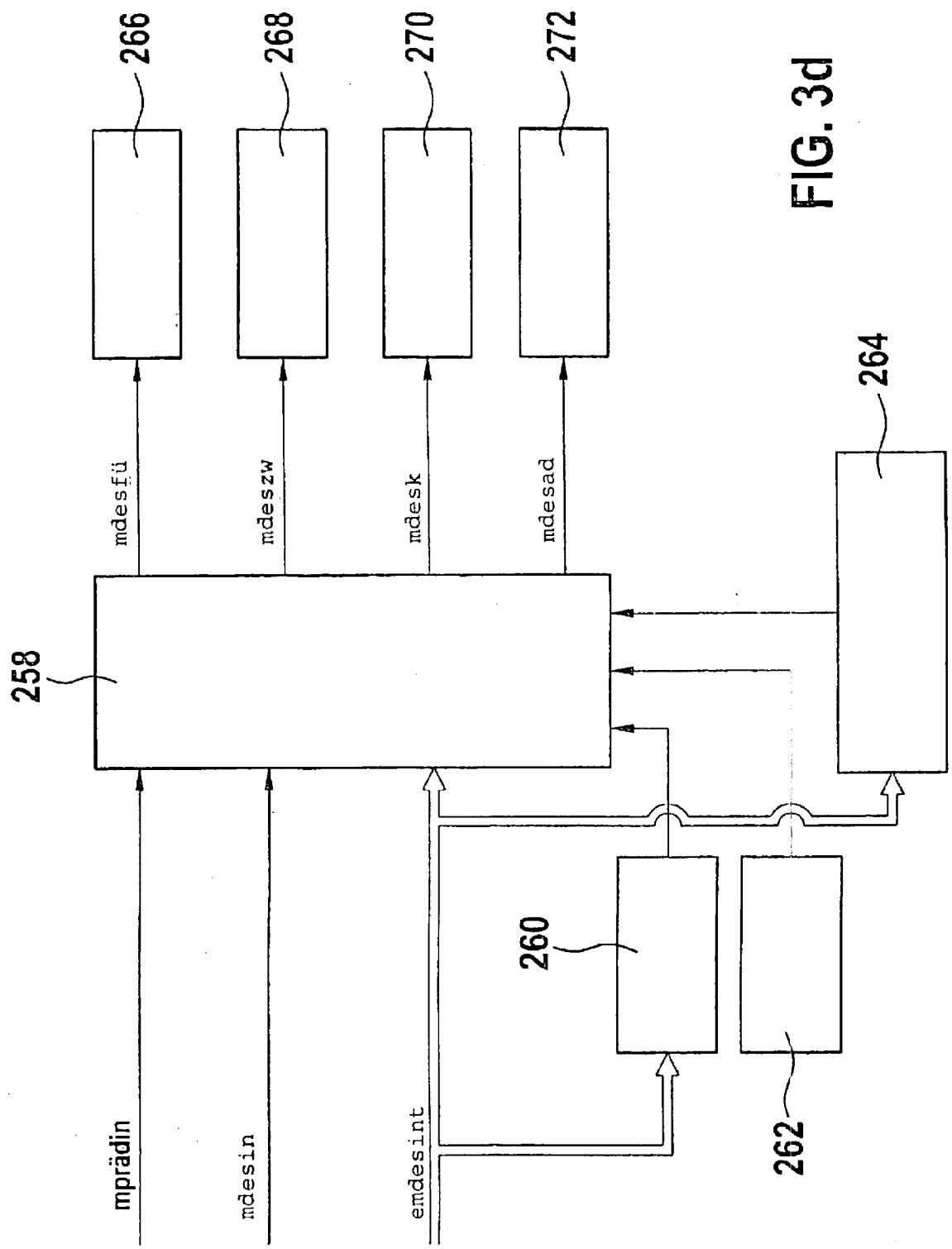

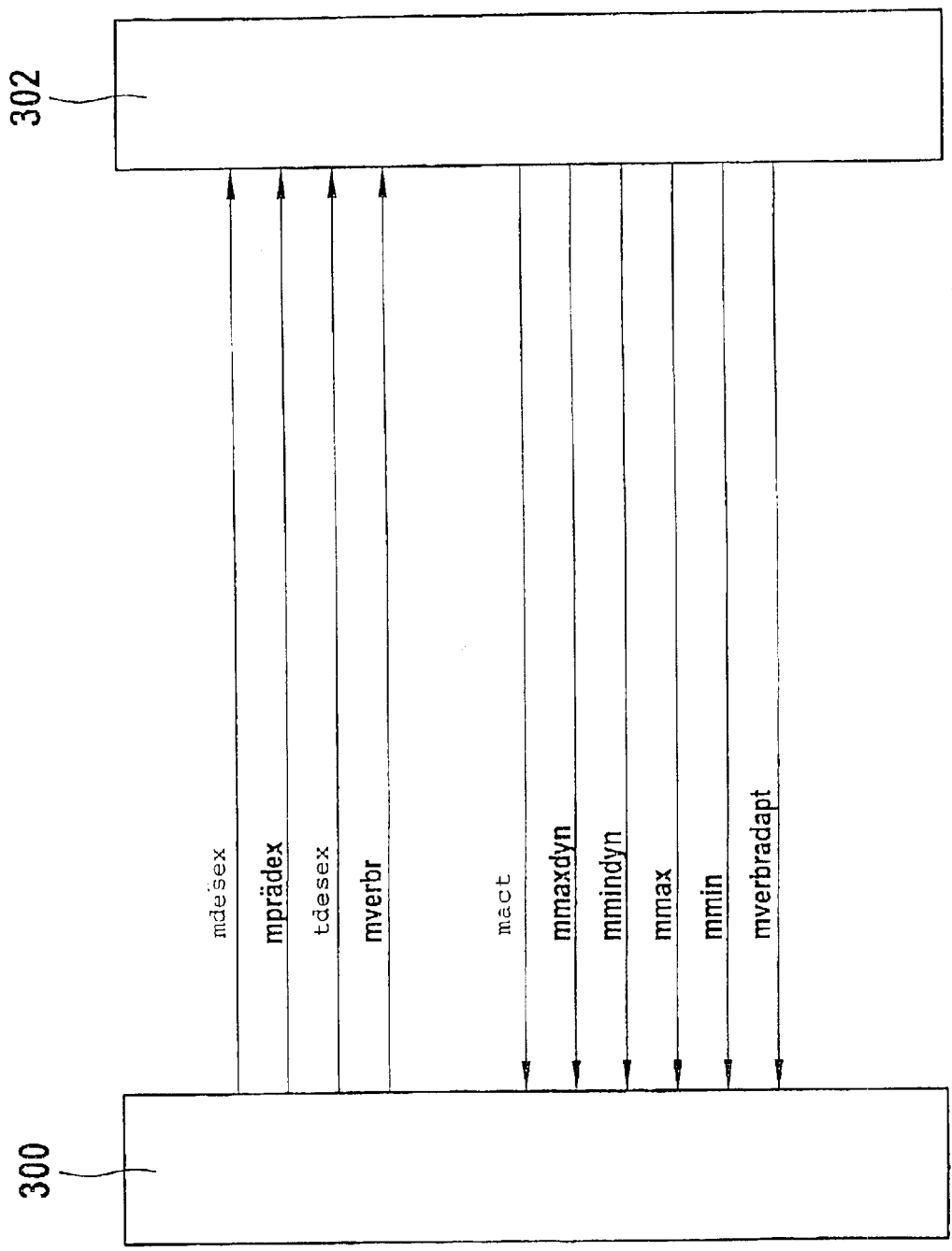

METHOD AND DEVICE FOR CONTROLLING THE DRIVE UNIT OF A VEHICLE

FIELD OF THE INVENTION

The invention relates to a method and an arrangement for controlling the drive unit of a vehicle.

BACKGROUND OF THE INVENTION

In modern vehicle controls, a plurality of inputs, which are in part mutually contradictory, operate on the available actuating members (for example, drive unit, transmission, et cetera). For example, the drive unit of a vehicle is intended to be controlled on the basis of: a drive command pregiven by the driver; desired values from external and/or internal control functions such as a drive slip control, an engine drag torque control, a transmission control, an rpm and/or speed limiting and/or an idle rpm control. These desired inputs exhibit, in part, a mutually contradictory character so that, since the drive unit can only adjust one of these desired value inputs, these desired value inputs must be coordinated, that is, a desired value input to be realized has to be selected.

In connection with the control of a drive unit, such a coordination of various desired torque values is known from DE 197 39 567 A1. Here, a desired value is selected from the torque desired values via maximum and/or minimum value selection. In the instantaneous operating state, this desired value is realized from the determination of the quantities of individual control parameters of the drive unit, for example, in an internal combustion engine, the charge, the ignition angle and/or the quantity of fuel to be injected. Various characteristics can be connected with the desired inputs, for example, with respect to the required dynamic of the adjustment, the priority, et cetera. These characteristics likewise can have a mutually contradictory nature and are not considered in the known coordination of the desired inputs.

In order to consider also such characteristics, it is provided in unpublished German patent application 199 61 291.9 of Dec. 18, 1999, to coordinate the characteristics assigned to the particular desired torques likewise by means of a coordinator in a comparable manner in order to obtain a resulting characteristic vector which forms the basis of the adjustment of the actuating variables of the drive unit.

In the known solution, the desired torques are combined based on their effect in maximum and minimum value selection stages and are coordinated separately for the slow (charge) control path and the rapid (ignition) control path. The consequence is a relatively complex structure having interfaces adapted especially to the particular configuration of the drive unit (for example, a spark-ignition engine).

SUMMARY OF THE INVENTION

A part of the torque structure, which is independent of the specific drive unit, is provided by decoupling the coordination of the external intervention quantities and the internal intervention quantities. This independent part of the torque structure can be used to the same extent for almost all types of drive units, for example, for diesel and gasoline engines as well as for electric motors. Only the coordinator for the internal quantities (that is, the quantities specific for the particular type) must be adapted to the particular drive unit.

The result is therefore a unified interface improved in an advantageous manner and a more transparent structure.

Furthermore, because of the decoupling of the conversion of the torque, which results from the coordination, and the decoupling of the conversion of the characteristic vector, which results there, into actuating variables of the drive unit, the conversion of the torque is decoupled from the source of the torque request and degrees of freedom are obtained. Accordingly, it is, for example, not the source of the request which is decisive for the type of realization (for example, via ignition angles). This is determined in accordance with the current characteristics independently of the source of the request to be realized.

The input of defined quantities, that is, the definition of the interface between the two parts by means of the quantities, which are to be made available from the particular part, permits a further optimization and simplification of the structure and the interface. The defined quantities are selected with a view to an optimization of the engine control, the structure and the interface and are transmitted from the engine-independent part to the engine-specific part and/or vice versa. Furthermore, the interaction of the two parts even for separate development of the parts is ensured.

BRIEF DESCRIPTION OF THE DRAWINGS

The invention will be described below in greater detail with reference to the embodiments shown in the drawing. Here.

FIGS. 4 and 5 show, in a preferred embodiment, a specific configuration of the interface between engine-specific part and engine-independent part while naming the quantities to be made available from each part.

DESCRIPTION OF THE PREFERRED EMBODIMENTS OF THE INVENTION

Figure 1:
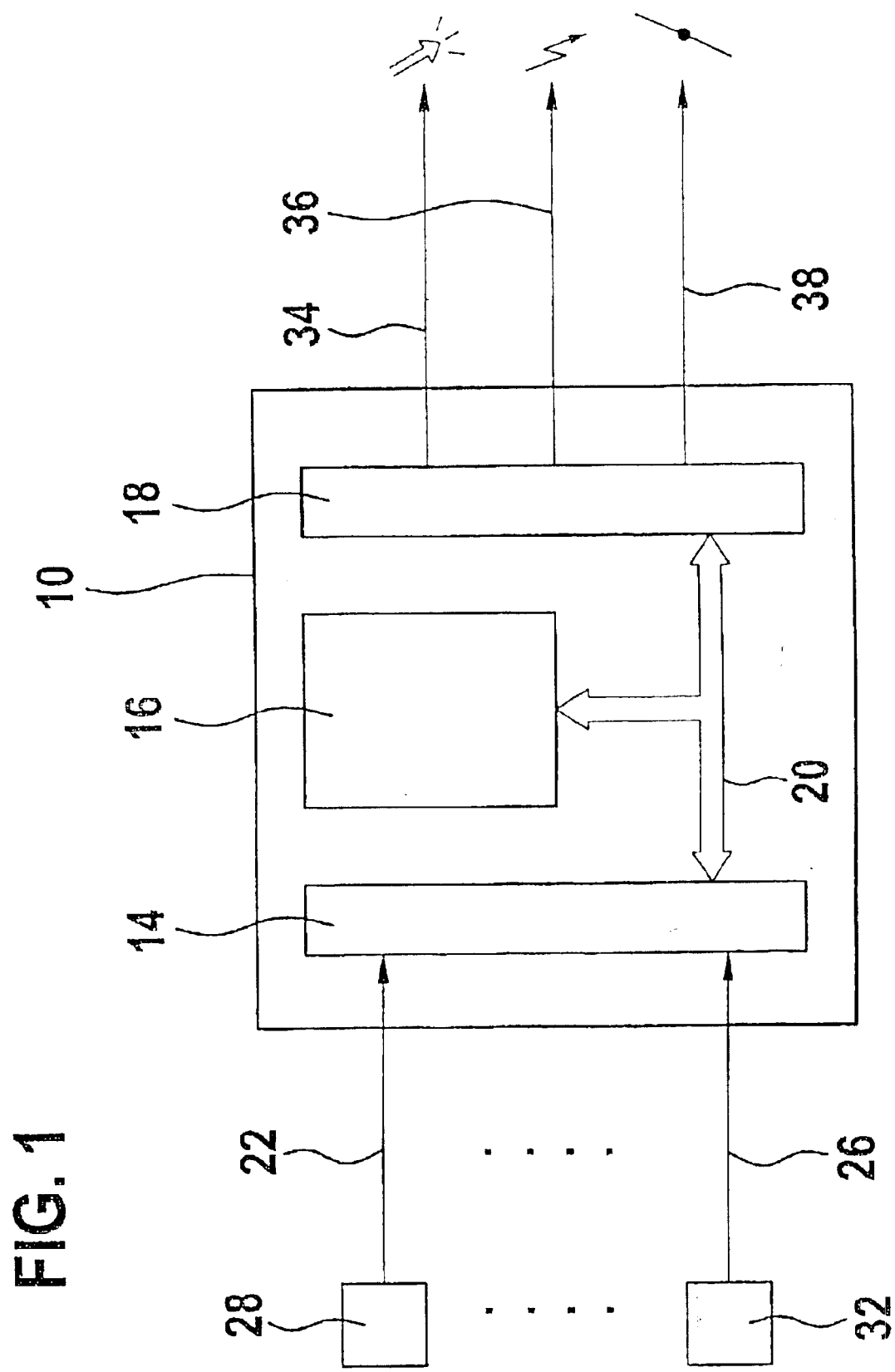
FIG. 1 shows an overview circuit diagram of a control arrangement for controlling a drive unit.

FIG. 1 shows a block circuit diagram of a control unit for controlling a drive unit, especially an internal combustion engine. A control unit 10 is provided, which includes as components: an input circuit 14, at least one computer unit 16 and an output circuit 18. A communications system 20 connects these components for the mutual exchange of data. Input lines 22 to 26 lead to the input circuit 14 of the control unit 10. In the preferred embodiment, the input lines are configured as a bus system and signals are supplied to the control unit 10 via these lines. The signals represent operating variables, which are to be evaluated for controlling the drive unit. These signals are detected by measuring devices 28 to 32. Such operating variables are: accelerator pedal position, engine rpm, engine load, exhaust-gas composition, engine temperature, et cetera. The control unit 10 controls the power of the drive unit via the output circuit 18. This is symbolized in FIG. 1 with the output lines 34, 36 and 38 via which the following are actuated: the fuel mass to be injected, the ignition angle of the engine as well as at least an electrically actuable throttle flap for adjusting the air supply to the engine. In addition to the described input quantities, further control systems of the vehicle are provided which transmit input quantities to the input circuit 14 such as torque desired values. Control systems of this kind are, for example, drive slip controls, driving dynamic controls, transmission controls, engine drag torque controls, speed controller, speed limiter, et cetera. Via the actuating paths shown, the following are adjusted: the air supply to the engine, the ignition angle of the individual cylinders, the fuel mass to be injected, the injection time point and/or the air/fuel ratio, et cetera. In addition to the illustrated desired value inputs, the external desired value inputs, to which belong also a desired value input by the driver in the form of a driver command and a maximum speed limiting, internal input quantities for controlling the drive unit are present, for example, a torque change of an idle controller, an rpm limiting, which outputs a corresponding desired input quantity, a torque limiting, et cetera.

Peripheral conditions or characteristics are connected with the individual desired value input quantity and these peripheral conditions or characteristics define the nature of the conversion of the desired value input quantities. Depending upon the application example, one or several characteristics can be connected to a desired value input quantity so that, in an advantageous embodiment, under the term "characteristics" a characteristic vector is to be understood wherein the various characteristic quantities are entered. Characteristics of desired value input quantities are, for example, the required dynamic in the adjustment of the desired value input quantity, the priority of the desired value input quantity, the magnitude of the torque reserve to be adjusted and/or the comfort of adjusting (for example, change limiting). These characteristics are present in a preferred embodiment. In other embodiments, only one or several characteristics are provided.

The described procedure is applicable not only in combination with internal combustion engines, but also in other drive concepts such as electric motors. In this case, the actuating quantities are to be adapted correspondingly.

In the preferred embodiment, torque quantities are used as desired value input quantities. In other embodiments, other quantities are inputted with appropriate adaptation. These quantities relate to output quantities of the drive unit and include power, rpm, et cetera.

Figure 2:
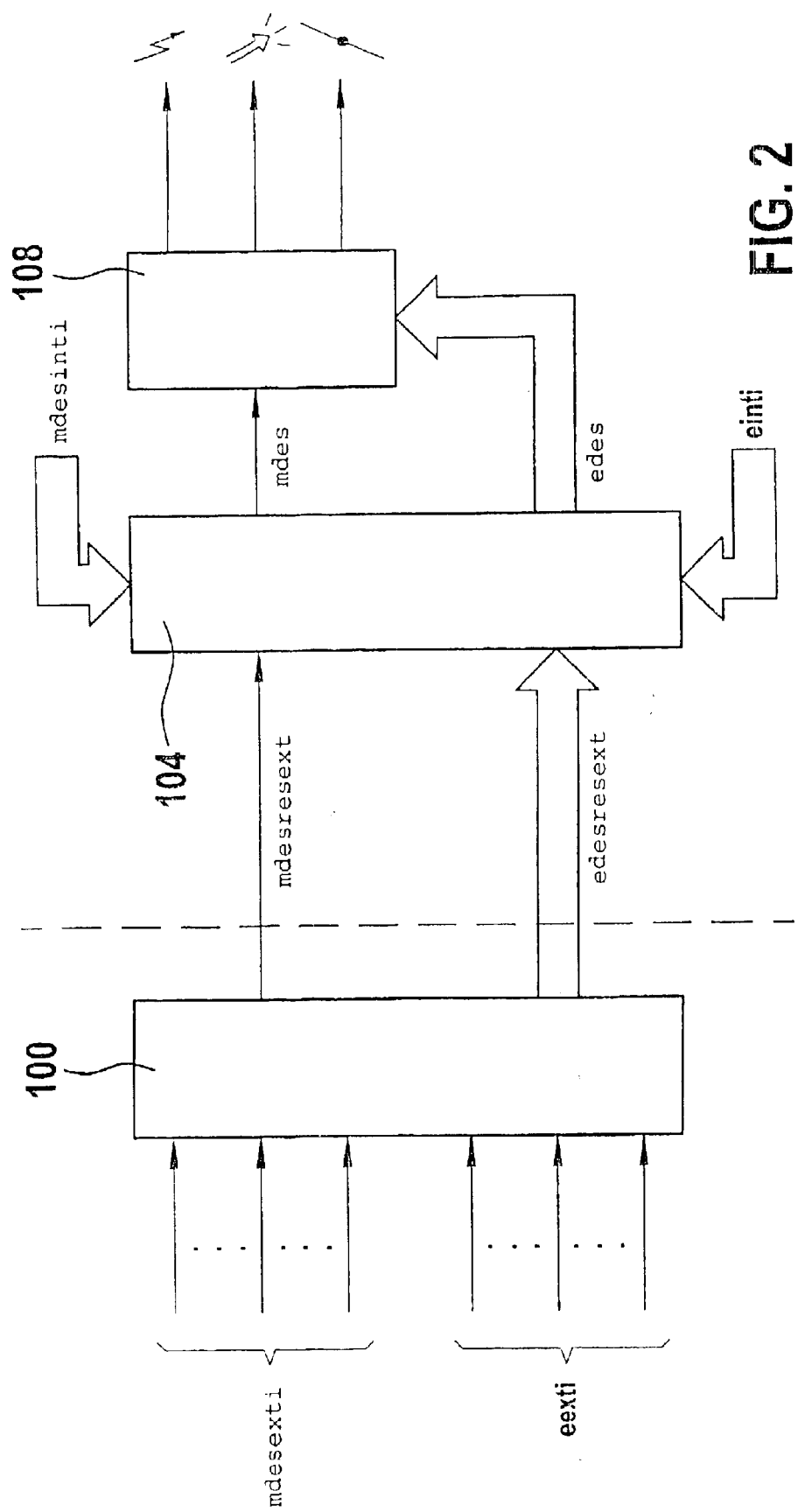
In FIG. 2, an overview sequence diagram is sketched for showing the torque structure described in detail in the following with reference to the sequence diagram in FIG. 3.

FIG. 2 shows an overview sequence diagram of the engine control program, which runs in the computer unit 16. The coordination of external quantities and the coordination of internal quantities are mutually decoupled and these coordinations are likewise decoupled from the conversion of the resulting desired value and the resulting characteristic value into actuating quantities of the drive unit.

The elements, which are shown in FIG. 2, define, as also in FIG. 3, individual programs, program steps or program parts while the connecting lines between the elements represent the flow of information.

In FIG. 2, a first coordinator 100 for the external desired torque input quantities including their characteristic quantities is provided. The external desired quantities mdesexti and the characteristic(s) eexti, which is assigned thereto, are supplied to the coordinator 100. In one embodiment, the desired quantities are compared to each other, for example, in the context of minimum and maximum selection steps. As a result, a resulting torque desired value mdesresext and the corresponding characteristic edesresext are transmitted further. In other embodiments, for coordination, for example, a characteristic is selected in the context of a corresponding selection (for example, the smallest actuating time) and the desired values or the quantities derived therefrom are coupled to each other for the formation of a resulting value. The external desired quantities define the engine-independent intervention quantities such as: driver command torque, the desired torque of a road speed controller or of an adaptive road speed controller (ACC), a speed limiting, a driving stability control, an engine drag torque control and/or a drive slip control. These engine-independent input quantities, which are assigned to the drive, define output torques or transmission output torques and are coordinated on this plane. Here, also driving comfort functions are arranged such as a load impact damping function or a dashpot function. Additional engine-independent quantities relate to the propulsion. These include desired torques which originate from a transmission control and support the transmission shift operation, a limiting desired value for transmission protection and/or torque requirement values of ancillary equipment such as generators, climate compressors, et cetera. These too define external (engine-independent) interventions and are therefore coordinated in coordinator 100. These quantities represent a transmission output torque or an engine output torque which is also the output quantity of the coordinator 100. In the conversion of the torque values, the transmission/converter losses, amplifications in the drive train, et cetera are considered.

As mentioned above, the same applies to the characteristics of the external quantities eexti. At least one specific characteristic is assigned to each of the above desired quantities, for example, a specific actuating time, from which a resulting characteristic vector edesresext is formed in correspondence to the torque coordination in the coordinator 100. In one embodiment, the characteristic vector can contain also information as to the current operating state (for example, released accelerator pedal) as well as externally pregiven limit values. The values, which proceed from the coordination of the external quantities in the coordinator 100, are supplied to a coordinator 104, wherein the resulting external quantities are coordinated with internal quantities, that is, engine-specific quantities. The interface between the engine-independent and the engine-specific part of the engine control lies between the coordinators 100 and 104.

The internal desired quantities mdesinti or einti are supplied to the coordinator 104. The engine-dependent quantities are especially desired values of internal engine limits, for example, for reasons of component protection, protection against becoming lean at full load, a desired value for a maximum rpm limiting, et cetera. In addition, for determining the desired torque in FIG. 2, corrective quantities (not shown) of rpm controls, stall protective controller, idle controller as well as engine losses and drag torques and engine-proximate driving comfort functions are included. The output quantities of the coordinator 104 are a desired value for the inner torque, that is, the torque MDES, which is generated by combustion, and a corresponding characteristic vector edes.

The resulting quantities, which are outputted by the coordinator 104, are supplied to an engine-specific converter 108 which converts the resulting torque request (inner desired torque and characteristic vector) into desired values for the engine-specific actuating paths. In a gasoline engine, these are, for example, charge, ignition angle and/or injection and in a diesel engine, they are, for example, the fuel quantity and, in an electric motor, for example, the current. The instantaneous operating point of the motor and additional peripheral conditions, which influence the actuating paths, are also considered. The conversion of the desired torque and of the characteristic vector into the actuating paths is, for example, carried out as described in the state of the art mentioned initially herein in that the actuating path is selected, which can ensure the availability of the required torque in the required time. Parts of the converter 108 are also interventions which act directly on an actuating path, for example, ignition angle intervention of an anti-bucking controller, additional charge for a torque reserve in idle, et cetera.

In the above, the characteristics are combined in a characteristic vector e. Depending upon the embodiment, the characteristic vector includes different quantities. In a preferred embodiment, which is also shown further below with respect to FIG. 3, the characteristic vector includes at least one predicted torque, which corresponds to the unfiltered driving command in the normal case, which predicted torque, however, can be adapted by other interventions, especially interventions which require a certain torque reserve. Furthermore, an actuating time, which corresponds to each desired torque, as well as information as to vehicle operation (for example, dynamic information, requested rpm limits, load impact damping active bits or dashpot active bits, idle active bits, comfort adjustments, et cetera) are components of the characteristic vector.

Figure 3A:
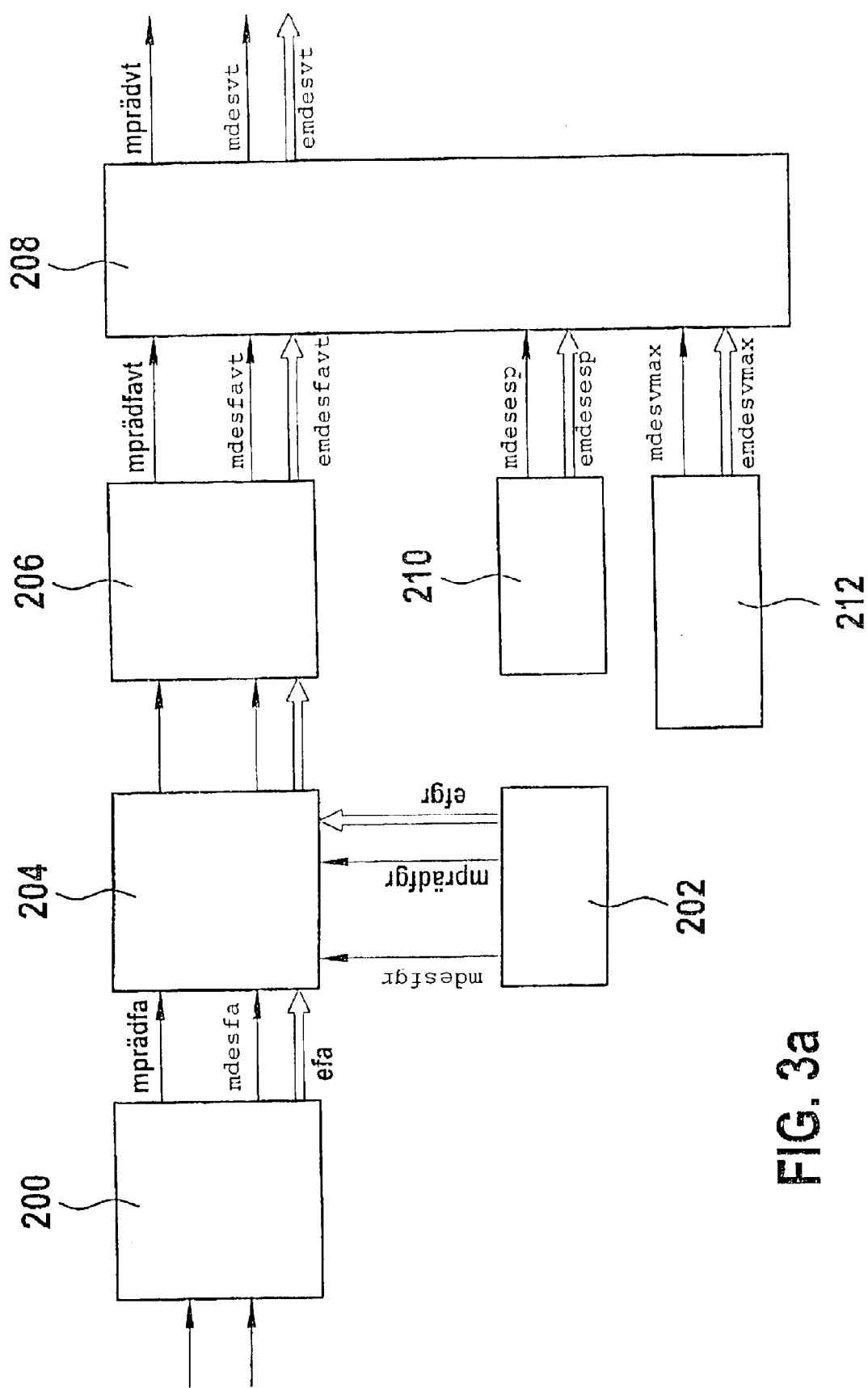
Figure 3B:
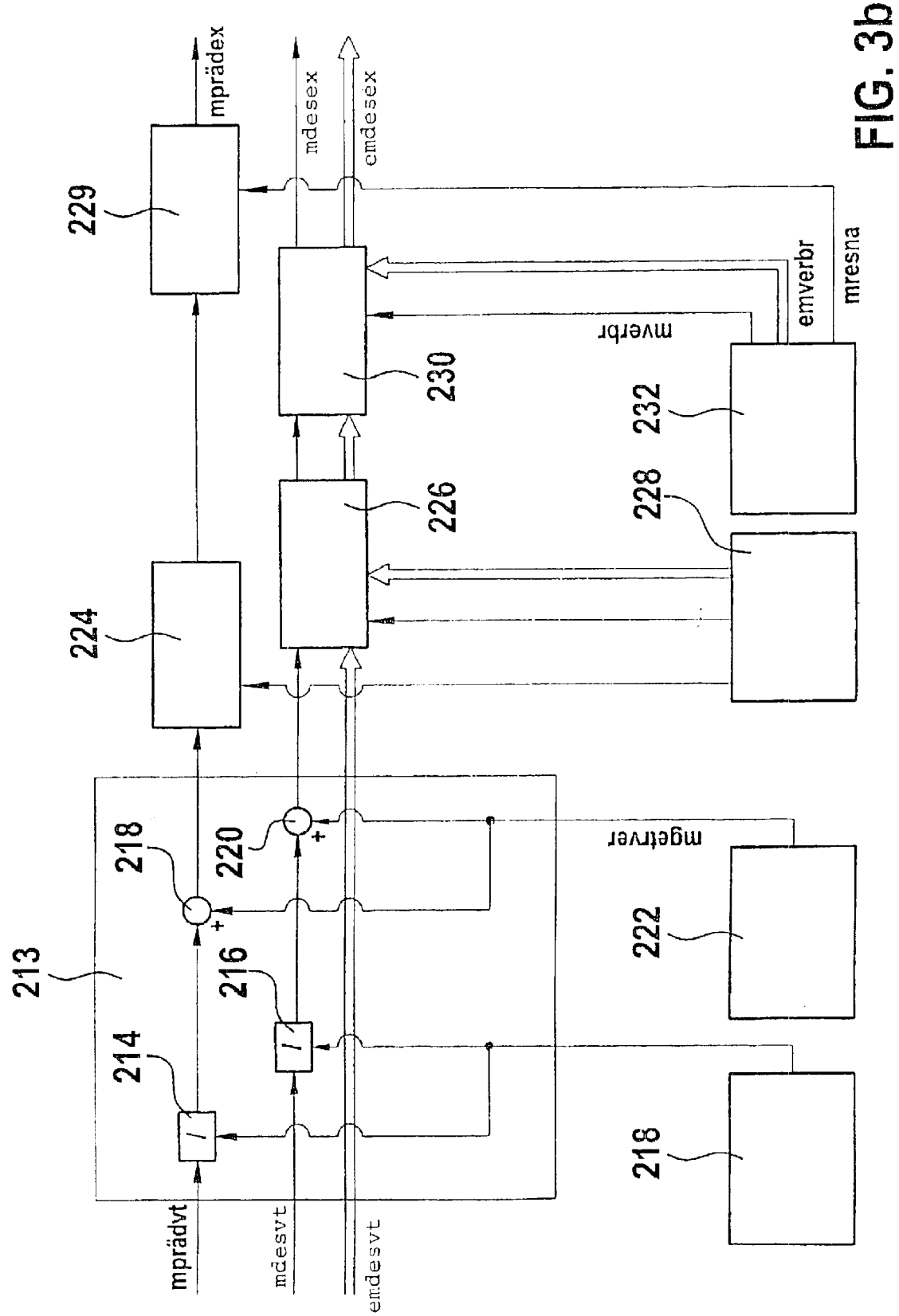
Figure 3C:
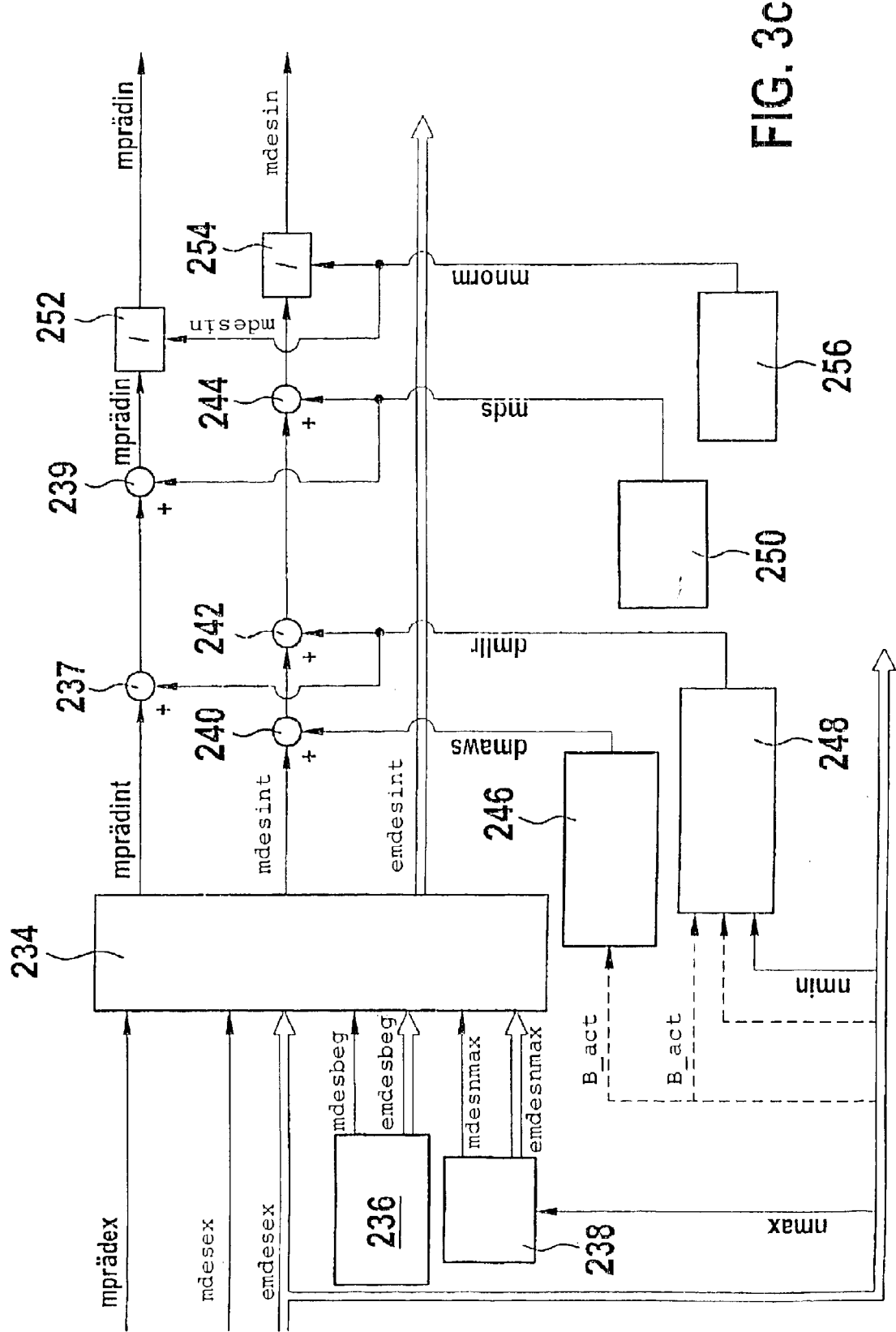

FIG. 3 shows a sequence diagram, which shows a preferred embodiment of the torque structure illustrated above. In FIGS. 3a and 3b, a preferred embodiment of the coordinator 100 is shown. In FIG. 3c, a preferred embodiment of the coordinator 104 is shown and in FIG. 3d, a preferred embodiment of converter 108. Here too, the individual elements describe programs, program parts or program steps of a program running in the microcomputer 16 of the control unit while the connecting lines represent the flow of information.

First, in 200, a driver command torque is determined in accordance, for example, with a characteristic field, for example on the basis of the motor rpm and the degree of actuation of the accelerator pedal by the driver. This driver command torque MDESFA defines a propulsion torque. Correspondingly, a predicted driver command torque MPRADFA is determined which, in a preferred embodiment, corresponds at first to the driver command torque and, in the following, represents the torque, which is to be adjusted in the future with a certain probability. At least a characteristic efa, for example, an actuating time within which the driver command torque is to be adjusted, and/or the actuating states of the pedal are assigned to the driver command torque. The actuating time is determined, for example, in dependence upon the rapidity of the pedal acceleration and is outputted. If the vehicle is equipped with a road speed controller 202 or an adaptive road speed controller, which considers additionally the distance to the vehicle traveling ahead, then the following are formed there: a torque desired quantity MDESFGR, a predicted quantity MDRADFGR (which can correspond to the desired torque or to the steady-state torque quantity to be reached) and assigned characteristic quantities efgr (actuating time, activating condition of the controller, et cetera). In the coordinator 204, the quantities, which are transmitted from the driver command determination 200 and from the speed controller 202, are coordinated. Accordingly, for example, for a switched-in road speed controller, the desired torque and the predicted torque, which was determined by the road speed controller 202, are transmitted further. Correspondingly, the characteristic vector, which is assigned to this torque, is transmitted further, for example, with respect to the actuating time. If the road speed controller is switched off, then the coordinator 204 enables the corresponding driver command quantities. In addition, this coordinator transmits, for example, the driver command desired torque including characteristics when this is greater than the speed controller desired torque. The resulting quantities of the coordinator 204 are supplied to the driver comfort functions 206. These include, for example, load shock damping functions or dashpot functions wherein the driver command or the desired torque input value of the road speed controller is subjected to a filtering to avoid abrupt torque changes. This filtering is applied especially to the torque desired value, but not to the predicted torque value. Correspondingly, characteristics can also be filtered, for example, selected characteristics such as actuating time information. The result after the comfort precontrol 206 is a desired value MDESFAVT for the propulsion torque, for the predicted propulsion torque MPRADFAVT as well as at least one characteristic EMDESFAVT assigned to these quantities.

The above-mentioned quantities are supplied to a coordinator 208 to which additional external intervention quantities are supplied, for example, from a drive stability control (ESP), an engine drag torque control (MSR) and/or a drive slip control system (ASR) 210. These functions give to the coordinator 208 likewise a desired propulsion torque (for example, MDESESP) and corresponding characteristic EMDESESP, which, in the preferred embodiment, contain especially the actuating time necessary for the adjustment. Furthermore, a speed limiter 212 is provided, which transmits a torque desired value MDESVMAX for the propulsion torque together with the corresponding characteristics EMDESVMAX in dependence upon the extent to which a maximum road speed of the vehicle is exceeded. These quantities are coordinated in coordinator 208. There, as described above, the torque desired values and the at least one characteristic are coupled to each other; whereas, the predicted torque (as the future torque, which is presumably to be adjusted after decay of these reducing or increasing interventions) is not coordinated with the desired torques of the external intervention. For example, for longer lasting reducing interventions, a predicted torque, which is influenced by the corresponding external desired torque value, can also be outputted. In the simplest case, the desired torques are selected on the basis of maximum and minimum value selection stages and the characteristics, which are assigned to the selected desired torque, as well as the state and input quantities (as resulting characteristics) are assumed. The output of the coordinator 208 is therefore a predicted propulsion torque MPRADVT, a resulting desired propulsion torque MDESVT as well as resulting characteristics EMDESVT. Physically, this torque is the torque at the output of the drive train of the vehicle.

To convert the propulsion torque values into transmission output torque values, the quantities, which are determined in the coordinator 208 (the predicted propulsion torque and the desired propulsion torque), are converted in accordance with the sequence diagram of FIG. 3b in step 213 in accordance with the train amplification (that is, the amplification factor between output and transmission, which, for example, is fixedly pregiven in a storage cell 218) and the transmission lost torque mgetrver. The transmission lost torque mgetrver is formed, for example, by means of a characteristic field 220 in dependence upon the current operating state of the transmission. Results are corresponding transmission output torque values. The characteristics are not converted insofar as they contain no propulsion torque values. In one embodiment, the conversion takes place in the logic positions 214 or 216 wherein the desired torque values are respectively coupled multiplicatively with the train amplification. The desired transmission output torque, which is formed in this manner, and the predicted transmission output torque are then corrected with the transmission lost torque MGETRVER in logic positions 118 or 220. In the preferred embodiment, the transmission lost torque is added to the predicted torque or to the desired transmission output torque. In addition, the transmission output torque values are converted into clutch torque values by means of the adjusted transmission ratio.

The predicted torque and the desired torque as well as its characteristic vector are supplied to coordinators 224 and 226, respectively. In these two coordinators, quantities are considered with respect to the transmission, that is, input quantities of the transmission control for the shift operation and/or of a transmission protective function. With respect to the transmission protection, a maximum value for the clutch torque is inputted in 228 to which the desired clutch torque is limited. With the transmission intervention, a specific clutch torque characteristic is pregiven which optimizes the shift operation. In coordinator 226, the desired clutch torque is compared to these desired torques and, in one embodiment, the lowest torque is transmitted further as the desired clutch torque. At least one characteristic quantity is assigned to the desired torque for the transmission intervention. This characteristic quantity inputs, for example, the necessary actuating time to realize the torque change during the shift operation. This characteristic quantity is coordinated with the at least one corresponding characteristic quantity of the desired clutch torque and, for example, in an active shift operation, the characteristic quantity of the transmission intervention torque has priority. In coordinator 224, the transmission intervention torque is logically coupled to the predicted clutch torque. In one embodiment, the predicted clutch torque is transmitted unchanged while, in another embodiment, especially for longer lasting interventions, the predicted torque is adapted via the transmission clutch torque.

The output quantities of coordinators 224 and 226 are supplied to additional coordinators 229 and 230, respectively, in which the torque requests of ancillary equipment are considered. These torque requests are, for example, determined by characteristic fields 232 in dependence upon the operating state of the particular ancillary apparatus (climate system, blower, et cetera). In coordinator 230, the desired clutch torque is coupled with the consumer torque MVERBR which is the sum which defines the torque requests of all consumers considered. The consumer torque is assigned at least one characteristic quantity EMVERBR. Here too, as a characteristic, especially the requested actuating time for the adjustment of the torque request of the consumers and, if required, the status of individual consumers, is provided. In one embodiment, for example, the torque requirement value MVERBR is added to the desired clutch torque in the coordinator 230, when the corresponding consumer is active. As a resulting characteristic, in this embodiment, for example, the shortest actuating time is transmitted further. In coordinator 229, and in the same manner as coordinator 224, the reserve torque MRESNA, which is necessary for the realization of the torque requirement MVERBR of the consumer, is coupled to the predicted clutch torque. In one embodiment, the predicted torque is increased by the reserve torque so that the predicted clutch torque is increased when a torque increase is to be expected by the consumers (switch-on); whereas, the predicted clutch torque is lowered when a lowering of the torque requirement of the consumers is to be expected (for example, switch-off). The output quantities of the coordinators 229 and 230 define the external quantities which are shown in FIG. 2 as output quantities of the coordinator 100. The coordinator 229 outputs a predicted motor output torque MPRÄDEX and the coordinator 230 outputs a motor output desired torque MDESEX and at least one assigned characteristic quantity EMDESEX.

In accordance with FIG. 3c, the above-mentioned quantities are supplied to a coordinator 234 wherein these quantities are coordinated with engine-specific input quantities. Here, in a preferred embodiment, a desired value MDESBEG having assigned characteristic quantity EMDESBEG is supplied by a torque limiter 236 and a desired quantity MDESNMAX having a corresponding characteristic quantity EMDESNMAX is supplied by a maximum rpm limiter 238. The desired value of the torque limiter 236 is determined, for example, in accordance with the magnitude of exceeding a limit value for the torque by the actual torque and the desired torque of the maximum rpm limiter 238 is determined in dependence upon the extent of the maximum rpm being exceeded by the rpm of the vehicle. Correspondingly, the actuating times are pregiven as preferred characteristic quantities. As shown in FIG. 3c, the maximum rpm nmax can also be a characteristic quantity of the vector EMDESEX and be inputted from outside.

On the basis of its input quantities, the coordinator 234 forms resulting output quantities for the motor output torque and the at least one assigned characteristic. In the preferred embodiment, the smallest is selected from the supplied desired quantities and is outputted as desired output torque MDESINT. In another embodiment, the desired quantities are logically coupled to each other by means of arithmetic operations. The predicted torque remains unchanged in one embodiment and, in another embodiment, it is adapted by the desired quantities especially for a longer lasting reducing intervention. With respect to the at least one characteristic quantity, a coordination likewise takes place and the result is at least a resulting characteristic quantity EMDESINT which, depending upon the embodiment, with reference to the actuating time, is the shortest of the actuating times or is the actuating time assigned to the resulting torque quantity. Further, operating state information is part of the characteristic quantities as outlined above.

The desired torque mdesint is supplied to a logic position 240 wherein the desired torque is corrected in dependence upon the output signal of an anti-stall controller 246. This output signal defines a corrective torque DMAWS which is formed in dependence upon the engine rpm and anti-stall desired rpm. The quantity of the corrective torque is dependent upon the spacing of the actual rpm to the anti-stall rpm. The condition signal B_act activates the controller, for example, when a driver command or external intervention is present, and is preferably a part of the characteristic vector EMDESEX as shown in FIG. 3c. The corrected desired torque is then supplied to a logic position 242 wherein a corrective torque DMLLR of an idle controller 248 is superposed on the desired torque. The activation conditions B_act and B_act2 of the idle controller 248 (idle state, no driver command, et cetera) are likewise part of the characteristic vector EMDESEX. Furthermore, a minimum rpm NMIN of the idle controller is part of the characteristic vector. The corrective torque DMLLR is formed on the basis of actual rpm and desired rpm. This corrective torque is superposed in the logic position 237 also onto the predicted torque MPRÄDINT.

The engine lost torque values (drag torque values) MDS are formed in accordance with temperature-dependent and rpm-dependent characteristic lines or characteristic fields 250. These engine lost torque values are superposed onto the predicted output torque and the desired output torque in the logic positions 239 and 244, respectively. The result is an inner predicted torque MPRÄDIN and an inner desired torque MDESIN, which are standardized with a reference torque MDNORM in further corrective stages 252 and 254. Output quantities of the corrective stages 252 and 254 are thereby standardized predicted inner torques MPRÄDIN or standardized desired values for the inner torque MDESIN. The standard torque is formed in dependence upon the operating quantities (for example, rpm and load) in a characteristic field 256. The characteristic vector EMDESINT is formed by coordinator 234 and is not influenced.

The predicted inner torque or the inner desired torque are supplied to the converter 258 in accordance with FIG. 3d and the characteristic vector EMDESINT is also supplied to the converter, with which the inner desired torque is to be converted. Functions are also arranged in this plane which intervene directly on the actuating paths of the engine, for example, an anti-bucking controller 260, a controller 262, which makes available a certain torque reserve via the ignition angle for the catalytic converter heater, as well as the idle controller part 264 which adjusts the idle torque reserve value and carries out the ignition angle intervention of the idle controller. Proceeding from the mentioned functions, control quantities are supplied to the converter 258, which considers the same in the conversion of the desired torque. As indicated in FIG. 3d, the information as to the respective activation region of the functions is transmitted as part of the characteristic vector EMDESINT. Proceeding from the desired torque value MDESIN, the converter 258, while considering the characteristics (especially the required actuating time) forms desired torques MDESFÜ for the following: the charge, the ignition angle MDESZW, the injection or suppression MDESK and, if needed, the charger MDESAD. These desired torques are adjusted by the corresponding adjusting devices 266, 268, 270 and 272. The charge desired torque is converted into a desired throttle flap position and the other desired torques are converted to reduce the deviation while considering the actual torque. Such a procedure is known. The predicted torque and the reserve values, which are formed by the catalytic converter heater controller and the idle controller, are likewise considered. Preferably, the maximum value of the available desired quantities (MDESIN, MPRÄDIN, reserve) is formed and outputted as charge desired value. The other interventions are activated in dependence upon the actuating time and corresponding desired quantities are formed. The output quantities of the functions (idle controller, anti-buck controller) operate directly on the actuating paths (higher ignition angle) and are superposed directly onto the corresponding desired torques.

The measures, which are shown above in combination, are realized in any desired selection and even individually depending upon the embodiment. The preferred realization takes place as a computer program which is stored in a storage medium (diskette, memory component, computer, et cetera).

Figure 5:
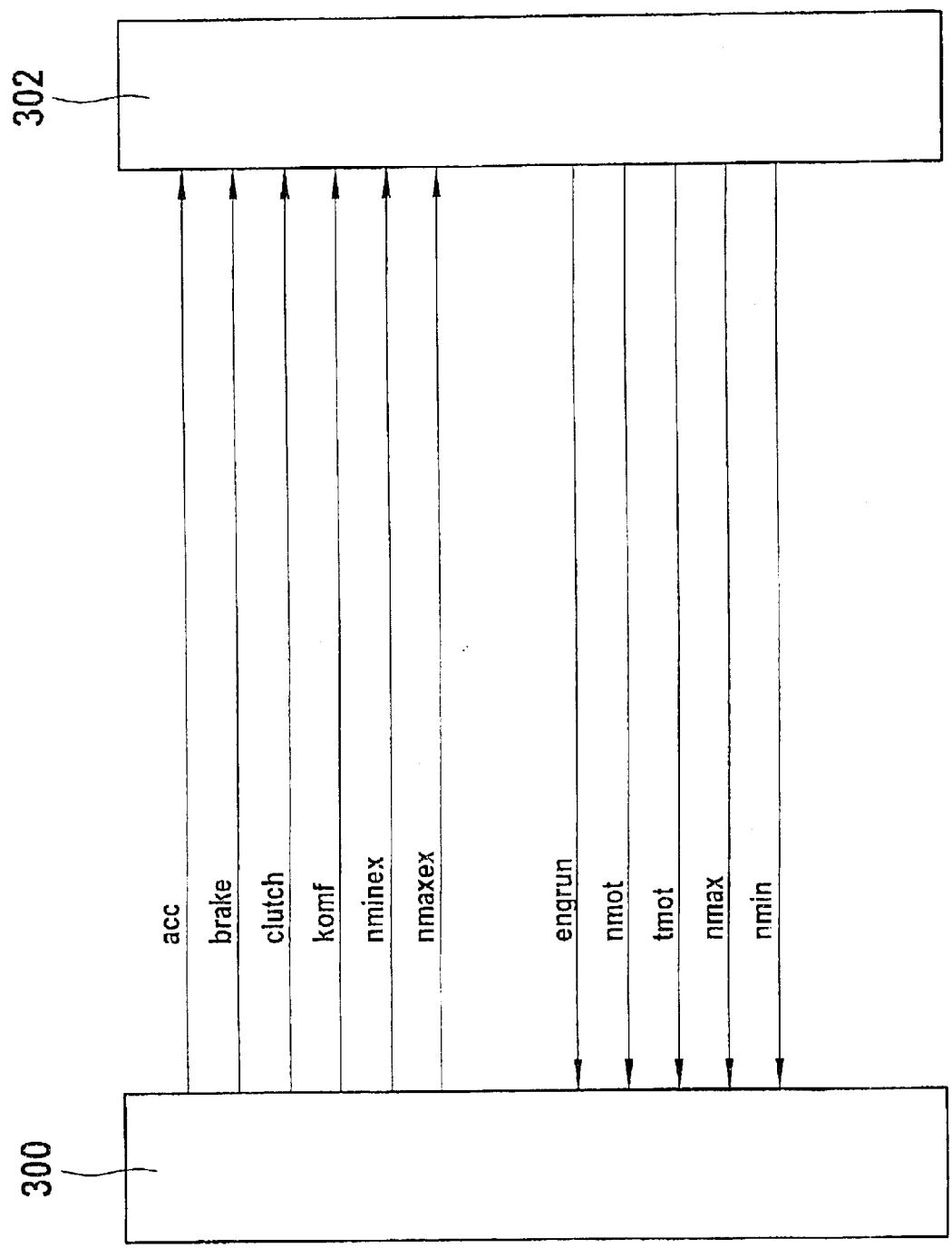

In FIGS. 4 and 5 and in a preferred embodiment, a specific configuration of the interface between the engine-specific and the engine-independent part is shown while providing the quantities made available from the respective parts. FIG. 4 relates to all torque quantities or quantities which are directly related to the torque adjustment; whereas, in FIG. 5, additional quantities are shown. These quantities were combined above essentially as characteristic vector. The subdivisions in FIGS. 4 and 5 are provided only for reasons of clarity.

What is special in the interface shown in FIGS. 4 and 5 comprises, inter alia, that quantities are also transmitted from the engine-specific part to the engine-independent part.

The torque quantities (preferably the clutch torque quantities, crankshaft torque quantities or other engine output torque quantities), which are to be made available by the engine-specific part 302 and by the engine-independent part 300, are shown in FIG. 4. The engine-specific part 302 and the engine-independent part 300 correspond essentially to the illustration of FIG. 3.

As already shown above with respect to FIG. 3, the engine-independent part 300 makes available the following quantities: desired torque MDESEX, predicted desired torque MPRÄDEX (which can also contain a pregiven torque reserve) (both, for example, in Nm) as well as the desired actuating time TDESEX (for example, in msec) with which the desired torque is to be adjusted. This desired torque is, in the above, part of the characteristic vector. An example for the application of this quantity in the engine-specific part is described above. Furthermore, and according to FIG. 4, the torque requirement of the ancillary equipment MVERBR (for example, in Nm) is made available by the engine-independent part 300. The determination of this torque value is described above. It defines the difference between the engine output torque and the clutch torque. This torque value is evaluated in the engine-specific part, for example, with the computation of the lost torque of the engine. In one embodiment, an engine requested quantity (for example, in Nm), which is not shown in FIG. 4, is transmitted from the engine-independent part 300 to the engine-specific part 302, which describes the desired torque without the correction via the intervention of a transmission control.

The engine-specific part 302 makes available, on the torque plane according to FIG. 4, the actual torque MACT (preferably, the actual torque at the crankshaft) which is measured or computed. Furthermore, a maximum adjusting range of the rapid path (shift via ignition angle, fuel quantity, et cetera) is determined by means of maximum and minimum torque values MMAXDYN and MMINDYN which are adjustable via the influenceable parameters of the rapid adjusting path. These quantities are evaluated by external functions such as a drive slip control. For example, MMAXDYN or MMINDYN afford information as to the possible rapid adjusting range, whereas MACT is considered in the computation of the input values. Furthermore, characteristic lines are made available by the engine-specific part 302 and these characteristic lines describe the maximum and minimum steady-state attainable torques MMAX and MMIN (minimum torque is equal to maximum attainable drag torque), for example, as a function of the rpm. These serve as condition information in the determination of the transmission shift strategy. The characteristic lines are transmitted in the form of value pairs and are stored in the engine-independent part. Furthermore, the engine-specific part 302 makes available an adaptation quantity MVERBRADAPT for the consumer torque MVERBR which is determined in a manner known per se (see, for example, DE-A 43 04 779=U.S. Pat. No. 5,484,351). With this information, the engine-independent part is in the position to correct or compensate its computations as to the consumer torque MVERBR. Not shown are additional quantities which are transmitted either additionally to the above-mentioned or are transmitted alternatively thereto from the engine-specific part 302 to the engine-independent part 300, such as the current drag torque (which, for example, is computed in accordance with the state of the art given above), the actual maximum torque (crankshaft torque, in dependence upon the current operating state) and/or maximum and minimum torques (minimum torque=maximum attainable drag torque) attainable under optimal conditions (depending upon rpm, elevation above sea level, temperature, et cetera). All torque quantities have the unit Nm in an embodiment.

Outside of the torque plane, as shown in FIG. 5, actuating signals (either continuously or as shift state) are made available for the accelerator pedal (ACC), for the brakes (BRAKE), and for the clutch (CLUTCH) (for example, as percentage quantity). These quantities are evaluated in the engine-specific part 302, for example, for activating different functions such as idle controller, comfort functions, et cetera. In order to cover system networks, which do not have the sensors required therefor, it is provided that, alternatively or supplementally, there is a transmission of the switching state (for example, as bit signal) of a brake pedal contact and/or of a clutch pedal contact via the interface. Not shown is an information as to the idle command of the driver (request minimum torque, preferably likewise as bit signal) which can be transmitted alternatively or additionally in one embodiment. A further quantity not shown (likewise as bit signal) is the information that the force connection is present in the drive train.

In addition, a mark KOMF (coded word) is made available, which informs as to the operating state of comfort functions such as a load impact damping function or a dashpot function (whether active or not). This quantity is used in the engine-specific part 302, for example, to estimate whether, for the torque adjustment, comfort questions are to be considered (for example, rapidity of the adjustment, avoiding jolts, et cetera) and/or is evaluated as to whether comfort functions, such as load impact damping or dashpot functions, are activated. Generally, this quantity therefore defines an information as to whether the comfort of the control is to receive a high priority or not. In this quantity, additionally or alternatively, the information can be included as to whether the driver command gradient is limited because of comfort reasons, whether, for the control of the engine, the force connection must be maintained, whether a component protection is to receive attention, whether a dynamic or highly dynamic adjustment is required, whether comfort functions are to be considered for the adjustment of the engine or not, whether the driver command value is to be adjusted with the highest priority, et cetera.

Further quantities (not shown) can be: information as to "transmission mode" ("position of the operating field", for example, neutral position, 1-position, 2-position, D-position, R-position, P-position, winter setting, et cetera); transmission type (hand shift, automatic, CVT, automated shift transmission); actual set gear (idle, first gear, second gear, et cetera) and/or information as to the position of the ignition switch (off, standby, radio, control apparatus provided with current (clamp 15), starter (clamp 50), et cetera). This information is preferably sent as a word of pregiven length wherein the information is coded.

Additionally, or supplementary, in one embodiment, non-engine-specific measurement quantities are transmitted from the engine-independent part to the engine-specific part, for example, ambient temperature, atmospheric pressure, longitudinal speed, battery voltage, et cetera.

In addition, externally pregiven minimum and maximum rpms (NMINEX, NMAXEX) are made available, which define, for example, input quantities in connection with the idle controller and/or anti-stall controller (NMINEX) or a maximum prom limiting (NMAXEX).

The engine-specific part 302 makes available the following: an information ENGRUN (engine runs), engine-specific measurement quantities such as the current engine rpm NMOT and/or the current engine temperature TMOT as well as the current maximum rpm NMAX and the current minium rpm NMIN (=current idle desired rpm). These quantities are used in the engine-independent part either for computations (NMOT, for example, for the determination of the driver command torque) or function as condition information. Not shown are the integral component of the idle controller and/or the information as to the executed overrun cutoff, which are transmitted in one embodiment additionally or alternatively by the engine-specific part to the engine-independent part.

The above-mentioned quantities of the interface are used individually or in any desired combination depending upon the application and in dependence upon the request and peripheral conditions of the particular embodiment.

Depending upon the embodiment, engine-independent and engine-specific parts are implemented in a computer unit, in two different computer units of a control unit or in two spatially separated control units.

What is claimed is:

1. A method for controlling the drive unit of a vehicle, the drive unit having at least one actuating quantity, the method comprising the steps of:

applying input quantities, which are independent of said drive unit, for forming a first input quantity;

providing a motor-specific input quantity;

forming a second input quantity from said first input quantity and said motor-specific input quantity; and, said second input quantity influencing at least said actuating quantity for an output quantity of said drive unit.

2. The method of claim 1, wherein the output quantity is a torque of the drive unit.

3. The method of claim 1, wherein: in a first coordinator, the first input quantity is formed in dependence upon a driver command desired quantity, a desired quantity of a road speed controller, a desired quantity of a driving dynamic control system, an engine drag torque controller, an anti-slip controller and/or a maximum speed limiter.

4. A method for controlling the drive unit of a vehicle, the drive unit having at least one actuating quantity, the method comprising the steps of:

applying input quantities, which are independent of said drive unit, for forming a first input quantity;

providing a motor-specific input quantity;

forming a second input quantity from said first input quantity and said motor-specific input quantity;

said second input quantity influencing at least said actuating quantity for an output quantity of said drive unit;

in a first coordinator, the first input quantity is formed in dependence upon a driver command desired quantity, a desired quantity of a road speed controller, a desired quantity of a driving dynamic control system, an engine drag torque controller, an anti-slip controller and/or a maximum speed limiter; and, the input quantity is a desired propulsion quantity, which is converted into a desired output torque of the drive unit while considering the ratios in the drive train.

5. The method of claim 1, wherein a second coordinator is provided, which forms the second input quantity from the first input quantity and at least one engine-specific input quantity.

6. The method of claim 5, wherein the output quantity of the second coordinator is converted into an inner desired torque, while considering the lost torques of the drive unit.

7. A method for controlling the drive unit of a vehicle, the drive unit having at least one actuating quantity, the method comprising the steps of:

applying input quantities, which are independent of said drive unit, for forming a first input quantity;

providing a motor-specific input quantity;

forming a second input quantity from said first input quantity and said motor-specific input quantity;

said second input quantity influencing at least said actuating quantity for an output quantity of said drive unit; and, each input quantity is assigned at least one characteristic quantity which includes at least the desired actuating time for adjusting the input quantity; and, at least one resulting characteristic quantity is formed from the characteristic quantities of different input quantities in the first and second coordinators.

8. The method of claim 1, wherein the second input quantity is converted in a converter in accordance with at least one resulting characteristic quantity into actuating quantities for the actuating paths of the drive unit.

9. A method for controlling the drive unit of a vehicle, which includes at least one actuating quantity, which is adjusted in dependence upon at least one input quantity for an output quantity of the drive unit, the method comprising the steps of:

applying input quantities, which are independent of said drive unit, for forming a first input quantity;

providing a motor-specific input quantity;

forming a second input quantity from said first input quantity and said motor-specific input quantity;

said second input quantity influencing at least said actuating quantity for an output quantity of said drive unit;

determining a predicted input quantity which corresponds to the unfiltered driver command value in at least one operating state; and, adjusting the drive unit in at least one operating state in dependence upon said unfiltered driver command value.

10. An arrangement for controlling the drive unit of a vehicle, the arrangement comprising:

a control unit which includes at least one microcomputer which outputs at least one actuating quantity for controlling the drive unit in dependence upon at least one input value for an output quantity of the drive unit;

said output quantity being selected from several input quantities;

said control unit including a first coordinator, which applies input quantities which are independent of the drive unit, to form a first input quantity; and, said control unit including a second coordinator which forms the second input quantity, which influences the at least one actuating quantity, from the first input quantity and at least one engine-specific input quantity.

11. An arrangement for controlling the drive unit of a vehicle, the arrangement comprising:

at least one control unit which includes at least one microcomputer which outputs at least one actuating quantity for controlling the drive unit in dependence upon at least one input value for an output quantity of the drive unit;

a first part having engine-independent programs, which first part is connected via a predefined interface with a second part having engine-specific programs; and, said first part making available predetermined quantities at the interface and receiving predetermined quantities from the engine-specific part.

12. An arrangement for controlling the drive unit of a vehicle, the arrangement comprising:

at least one control unit, which includes at least one microcomputer which outputs at least one actuating quantity for controlling the drive unit in dependence upon at least one input value for an output quantity of the drive unit;

a part having engine-specific programs which communicates via a predefined interface position with a part having engine-independent programs; and, the engine-specific part making available predetermined quantities at the interface and receiving predetermined quantities from the engine-independent part.

13. An arrangement for controlling the drive unit of a vehicle, the arrangement comprising:

at least one control unit, which includes at least one microcomputer which outputs at least one actuating quantity for controlling the drive unit in dependence upon at least one input value for an output quantity of the drive unit;

a part having engine-specific programs which communicates via a predefined interface position with a part having engine-independent programs;

the engine-specific part making available predetermined quantities at the interface and receiving predetermined quantities from the engine-independent part; and, the quantities, which are prepared by the engine-independent part are: desired torque, predicted desired torque, desired actuating time, consumer torque, at least one accelerator pedal quantity, brake quantity, clutch actuating quantity, an information with respect to comfort of the control and/or pregiven minimum rpm values and/or maximum rpm values and/or at least one information as to transmission state or transmission type and/or the position of the ignition key and/or non-engine-specific measuring quantities and that the quantities, which are made available by the engine-specific part are: actual torque, maximum and minimum dynamically attainable torque values, steady-state maximum and/or minimum torques, maximum and/or minimum torques under optimal conditions, a corrective torque for the consumer torque, an information that the engine runs, engine-specific measuring quantities such as engine rpm and/or engine temperature, a maximum rpm and/or a minimum rpm and/or information as to the executed overrun operation and/or the integral component of the idle controller.

14. A storage medium comprising a computer program stored thereon for carrying out a method for controlling the drive unit of a vehicle, the drive unit having at least one actuating quantity, the method comprising the steps of:

applying input quantities, which are independent of said drive unit, for forming a first input quantity;

providing a motor-specific input quantity;

forming a second input quantity from said first input quantity and said motor-specific input quantity; and, said second input quantity influencing at least said actuating quantity for an output quantity of said drive unit.

15. A method for controlling the drive unit of a vehicle, which includes at least one actuating quantity, which is adjusted in dependence upon at least one input quantity for an output quantity of the drive unit, the method comprising the steps of:

determining a predicted input quantity which corresponds to the unfiltered driver command value in at least one operating state; and, adjusting the drive unit in at least one operating state in dependence upon said unfiltered driver command value.

* * * * *